US009194328B2

(12) United States Patent
Gukeisen

(10) Patent No.: US 9,194,328 B2
(45) Date of Patent: Nov. 24, 2015

(54) FAN VARIABLE AREA NOZZLE FOR A GAS TURBINE ENGINE FAN NACELLE WITH SLIDING ACTUATION SYSTEM

(75) Inventor: Robert L. Gukeisen, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 1980 days.

(21) Appl. No.: 12/441,729

(22) PCT Filed: Oct. 12, 2006

(86) PCT No.: PCT/US2006/039936
§ 371 (c)(1),
(2), (4) Date: Mar. 18, 2009

(87) PCT Pub. No.: WO2008/045062
PCT Pub. Date: Apr. 17, 2008

(65) Prior Publication Data
US 2009/0266912 A1 Oct. 29, 2009

(51) Int. Cl.
*F02K 1/06* (2006.01)
*F02K 1/12* (2006.01)
*F02K 3/06* (2006.01)
*F02K 3/075* (2006.01)

(52) U.S. Cl.
CPC .................. *F02K 1/1253* (2013.01); *F02K 3/06* (2013.01); *F02K 3/075* (2013.01); *F05D 2260/50* (2013.01)

(58) Field of Classification Search
USPC .............. 60/39.5, 770, 771, 772; 239/265.19, 239/265.33, 265.35, 265.39
See application file for complete search history.

(56) References Cited

U.S. PATENT DOCUMENTS

| 3,831,493 | A | | 8/1974 | Wanger |
| 3,892,358 | A | | 7/1975 | Gisslen |
| 3,988,889 | A | | 11/1976 | Chamay et al. |
| 4,068,469 | A | | 1/1978 | Adamson |
| 4,132,068 | A | | 1/1979 | Johnston |
| 4,827,712 | A | * | 5/1989 | Coplin .......................... 60/226.1 |

(Continued)

FOREIGN PATENT DOCUMENTS

| EP | 0687810 A | 12/1995 |
| GB | 2372779 A | 9/2002 |

(Continued)

OTHER PUBLICATIONS

Search Report and Written Opinion mailed on Nov. 28, 2007 for PCT/US2006/039936.
Notification of Transmittal of the International Preliminary Report on Patentability mailed Feb. 2, 2009 for PCT/US2006/039936.

*Primary Examiner* — Steven Sutherland
(74) *Attorney, Agent, or Firm* — Carlson, Gaskey & Olds, PC

(57) ABSTRACT

A fan variable area nozzle (FVAN) includes a flap assembly which varies a fan nozzle exit area. An actuator system drives a sliding drive ring relative a multitude of slider tracks mounted to a fan nacelle to adjust each flap of the flap assembly through the flap linkage to pitch the flap assembly about a circumferential hinge line to vary the diameter of the annular fan nozzle exit area between the fan nacelle and the core nacelle. The FVAN may be separated into a multiple of drive ring sectors which are each independently adjustable by an associated actuator of the actuator system to provide a low profile drag asymmetrical fan nozzle exit area.

16 Claims, 5 Drawing Sheets

(56) References Cited

U.S. PATENT DOCUMENTS

| | | | |
|---|---|---|---|
| 5,485,959 A * | 1/1996 | Wood et al. | 239/265.41 |
| 5,613,636 A * | 3/1997 | Zubillaga et al. | 239/265.35 |
| 6,192,671 B1 | 2/2001 | Elorriaga | |
| 6,415,599 B1 | 7/2002 | Ausdenmoore et al. | |

FOREIGN PATENT DOCUMENTS

| | | |
|---|---|---|
| GB | 865881 A | 3/2009 |
| JP | 2002-357158 | 12/2002 |
| JP | 2003-056405 | 2/2003 |
| JP | 2005-282572 | 10/2005 |

* cited by examiner

FAN VARIABLE AREA NOZZLE FOR A GAS TURBINE ENGINE FAN NACELLE WITH SLIDING ACTUATION SYSTEM

BACKGROUND OF THE INVENTION

The present invention relates to a gas turbine engine, and more particularly to a turbofan engine having a sliding drive ring FVAN.

Conventional gas turbine engines generally include a fan section and a core engine with the fan section having a larger diameter than that of the core engine. The fan section and the core engine are disposed about a longitudinal axis and are enclosed within an engine nacelle assembly.

Combustion gases are discharged from the core engine through a core exhaust nozzle while an annular fan flow, disposed radially outward of the primary airflow path, is discharged through an annular fan exhaust nozzle defined between a fan nacelle and a core nacelle. A majority of thrust is produced by the pressurized fan air discharged through the fan exhaust nozzle, the remaining thrust being provided from the combustion gases discharged through the core exhaust nozzle.

The fan nozzles of conventional gas turbine engines have a fixed geometry. The fixed geometry fan nozzles are a compromise suitable for take-off and landing conditions as well as for cruise conditions. Some gas turbine engines have implemented fan variable area nozzles. The fan variable area nozzle provide a smaller fan exit nozzle diameter during cruise conditions and a larger fan exit nozzle diameter during take-off and landing conditions. Existing fan variable area nozzles typically utilize relatively complex mechanisms that increase overall engine weight to the extent that the increased fuel efficiency therefrom may be negated.

Accordingly, it is desirable to provide an effective, lightweight fan variable area nozzle for a gas turbine engine.

SUMMARY OF THE INVENTION

A fan variable area nozzle (FVAN) according to the present invention includes a flap assembly which varies a fan nozzle exit area. The flap assembly is incorporated into an end segment of the fan nacelle to include a trailing edge thereof.

The flap assembly generally includes a multiple of flaps, flap linkages and an actuator system. The actuator system drives a sliding drive ring relative a multitude of slider tracks mounted to the fan nacelle. The sliding movement of the drive ring drives each flap of the flap assembly through the respective flap linkage to generate pivotal movement of the flap assembly about a circumferential flap hinge line. Pivotal movement of the flap assembly about the circumferential flap hinge line varies the diameter of the annular fan nozzle exit area between the fan nacelle and the core nacelle. By adjusting the FVAN, engine thrust and fuel economy are maximized during each flight regime.

The FVAN may be separated into a multiple of sectors which are each independently adjustable by an associated actuator of the actuator system to provide an asymmetrical fan nozzle exit area to vector thrust therefrom.

The present invention therefore provides an effective, lightweight fan variable area nozzle for a gas turbine engine.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
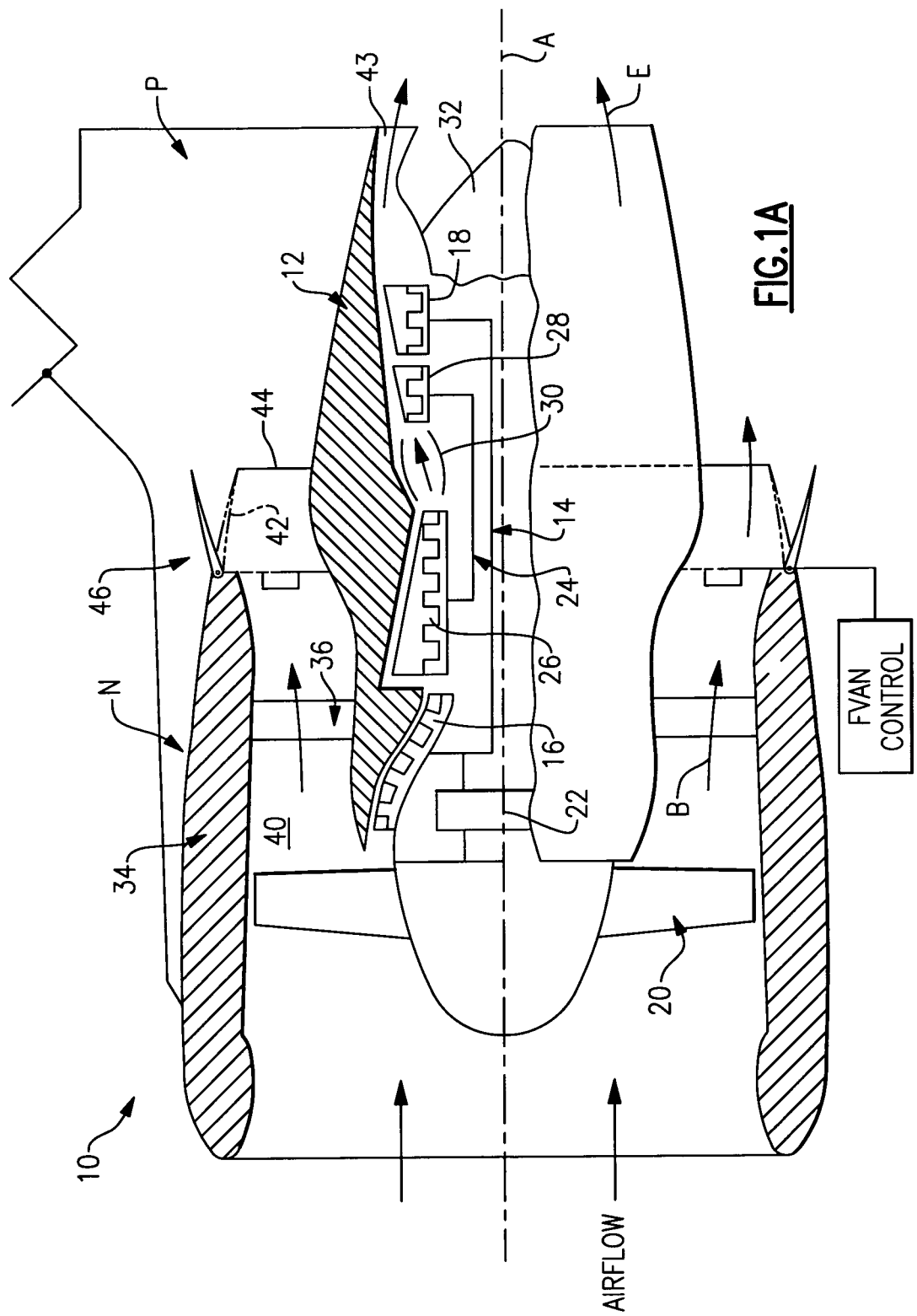
FIG. 1A is a general schematic partial fragmentary view of an exemplary gas turbine engine embodiment for use with the present invention.

FIG. 1A illustrates a general partial fragmentary schematic view of a gas turbofan engine 10 suspended from an engine pylon P within an engine nacelle assembly N as is typical of an aircraft designed for subsonic operation.

The turbofan engine 10 includes a core engine within a core nacelle 12 that houses a low spool 14 and high spool 24. The low spool 14 includes a low pressure compressor 16 and low pressure turbine 18. The low spool 14 drives a turbofan 20 through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 is preferably a high-bypass geared turbofan aircraft engine. Preferably, the engine 10 bypass ratio is greater than ten (10), the turbofan diameter is significantly larger than that of the low pressure compressor 16, and the low pressure turbine 18 has a pressure ratio that is greater than five (5). The gear train 22 is preferably an epicycle gear train such as a planetary gear system or other gear system with a gear reduction ratio of greater than 2.5. It should be understood, however, that the above parameters are only exemplary of a preferred geared turbofan engine and that the present invention is likewise applicable to other gas turbine engines.

Airflow enters a fan nacelle 34, which at least partially surrounds the core nacelle 12. The turbofan 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with, respective, spools 24, 14 to rotationally drive the compressors 26, 16 and through the gear train 22, the turbo fan 20 in response to the expansion. A core engine exhaust E exits the core nacelle 12 through a core nozzle 43 defined between the core nacelle 12 and a tail cone 32.

Figure 1B:
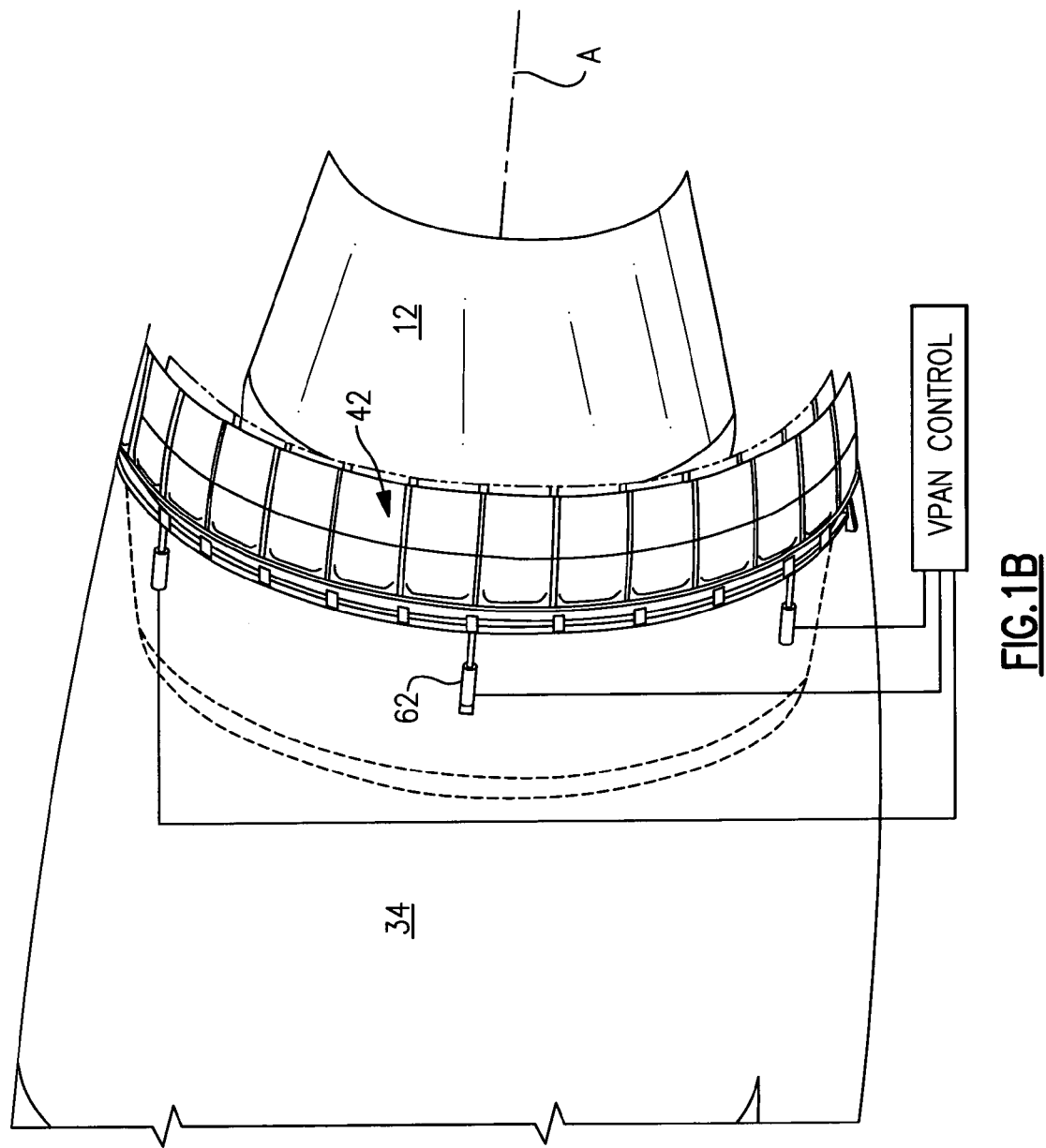
FIG. 1B is a perspective partial fragmentary view of the engine.

The core nacelle 12 is supported within the fan nacelle 34 by structure 36 often generically referred to as an upper and lower bifurcation. A bypass flow path 40 is defined between the core nacelle 12 and the fan nacelle 34. The engine 10 generates a high bypass flow arrangement with a bypass ratio in which approximately 80 percent of the airflow entering the fan nacelle 34 becomes bypass flow B. The bypass flow B communicates through the generally annular bypass flow path 40 and is discharged from the engine 10 through a fan variable area nozzle (FVAN) 42 (also illustrated in FIG. 1B) which defines a fan nozzle exit area 44 between the fan nacelle 34 and the core nacelle 12.

Thrust is a function of density, velocity, and area. One or more of these parameters can be manipulated to vary the amount and direction of thrust provided by the bypass flow B. The FVAN 42 changes the physical area and geometry to manipulate the thrust provided by the bypass flow B. However, it should be understood that the fan nozzle exit area 44 may be effectively altered by methods other than structural changes, for example, by altering the boundary layer. Furthermore, it should be understood that effectively altering the fan nozzle exit area 44 is not limited to physical locations approximate the exit of the fan nacelle 34, but rather, may include the alteration of the bypass flow B at other locations.

The FVAN 42 defines the fan nozzle exit area 44 for discharging axially the fan bypass flow B pressurized by the upstream turbofan 20. A significant amount of thrust is provided by the bypass flow B due to the high bypass ratio. The turbofan 20 of the engine 10 is preferably designed for a particular flight condition—typically cruise at 0.8M and 35,000 feet.

As the turbofan 20 is efficiently designed at a particular fixed incidence for the cruise condition, the FVAN 42 is operated to vary the fan nozzle exit area 44 for efficient engine operation at other flight conditions, such as landing and take-off and to meet other operational parameters such as noise level. Preferably, the FVAN 42 defines a nominal converged cruise position for the fan nozzle exit area 44 and radially opens relative thereto to define a diverged position for other flight conditions. The FVAN 42 preferably provides an approximately 20% (twenty percent) change in the fan exit nozzle area 44. It should be understood that other arrangements as well as essentially infinite intermediate positions as well as thrust vectored positions in which some circumferential sectors of the FVAN 42 are converged or diverged relative to other circumferential sectors are likewise usable with the present invention.

Figure 1C:
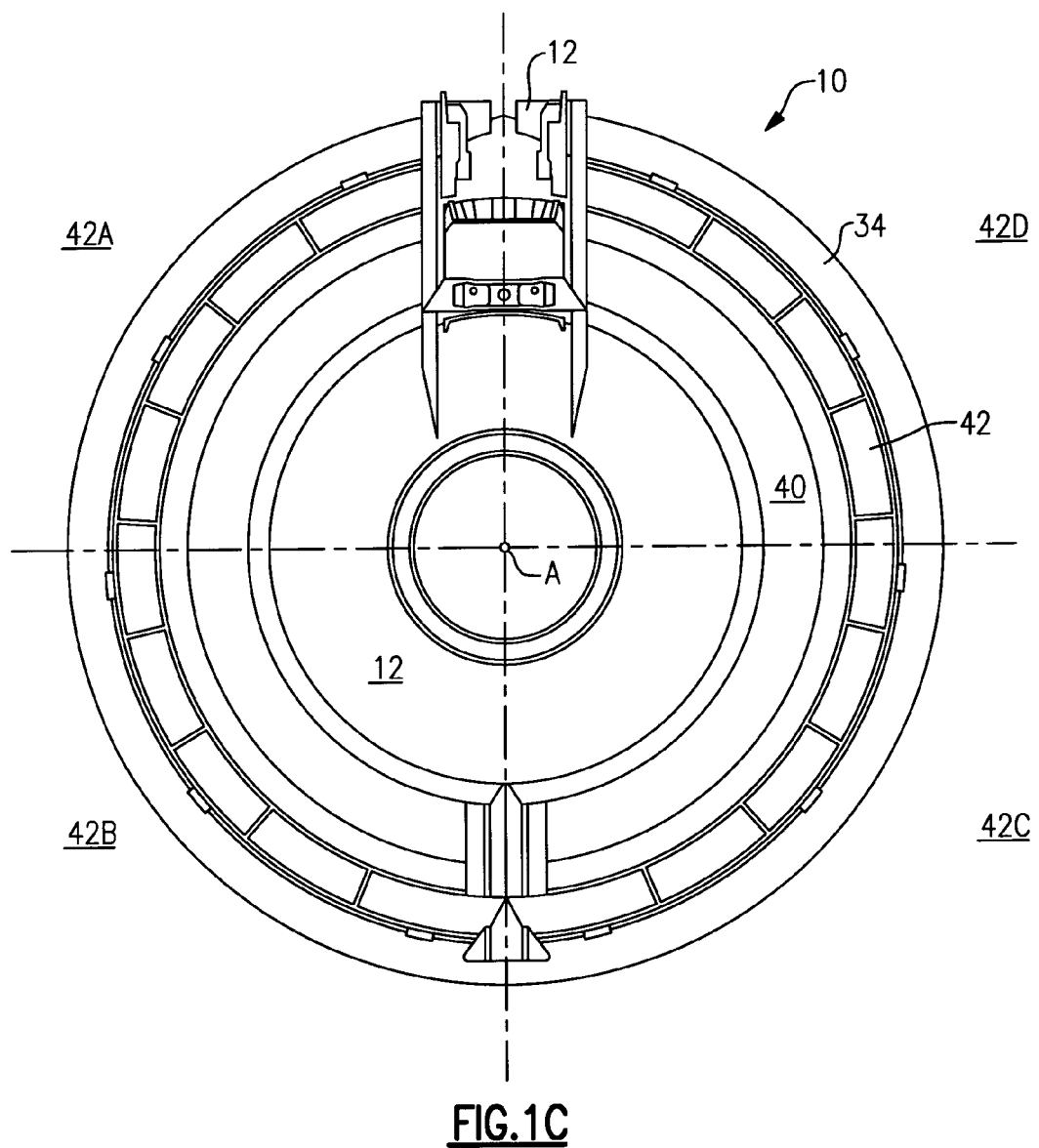
FIG. 1C is a rear view of the engine.

The FVAN 42 is preferably separated into four sectors 42A-42D (FIG. 1C) which are each independently adjustable to asymmetrically vary the fan nozzle exit area 44 to generate vectored thrust. It should be understood that although four segments are illustrated, any number of segments may alternatively or additionally be provided.

In operation, the FVAN 42 communicates with a controller C or the like to adjust the fan nozzle exit area 44 in a symmetrical and asymmetrical manner. Other control systems including an engine controller flight control system may likewise be usable with the present invention. By adjusting the entire periphery of the FVAN 42 symmetrically in which all sectors are moved uniformly, thrust efficiency and fuel economy are maximized during each flight condition. By separately adjusting the circumferential sectors 42A-42D of the FVAN 42 to provide an asymmetrical fan nozzle exit area 44, engine bypass flow is selectively vectored to provide, for example only, trim balance or thrust controlled maneuvering enhanced ground operations or short field performance.

Figure 2A:
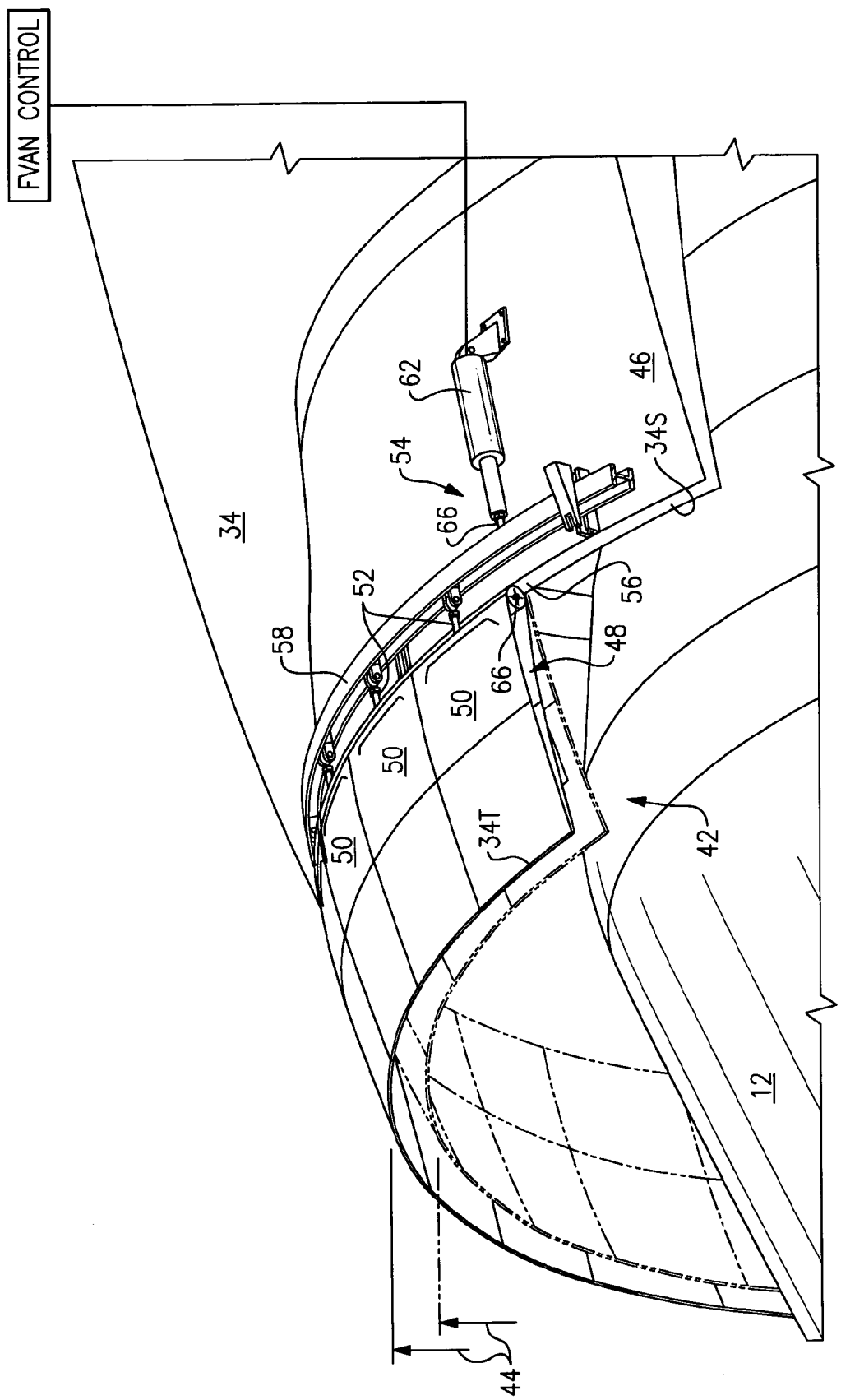
FIG. 2A is a partial phantom view of the FVAN.

Referring to FIG. 2A, the FVAN 42 generally includes a flap assembly 48 which varies the fan nozzle exit area 44. The flap assembly 48 is preferably incorporated into the fan nacelle 34 to define a trailing edge 34T thereof. The flap assembly 48 generally includes a multiple of flaps 50, a respective multiple of flap linkages 52 and an actuator system 54.

The actuator system 54 includes a multiple of actuators 62 which are fixed to the fan nacelle 34. Each actuator 62 is mounted to a drive ring 58 at a respective pivotal actuator attachment 66 through a push rod, pitch link, ball joint or other articulatable link or the like.

Figure 2B:
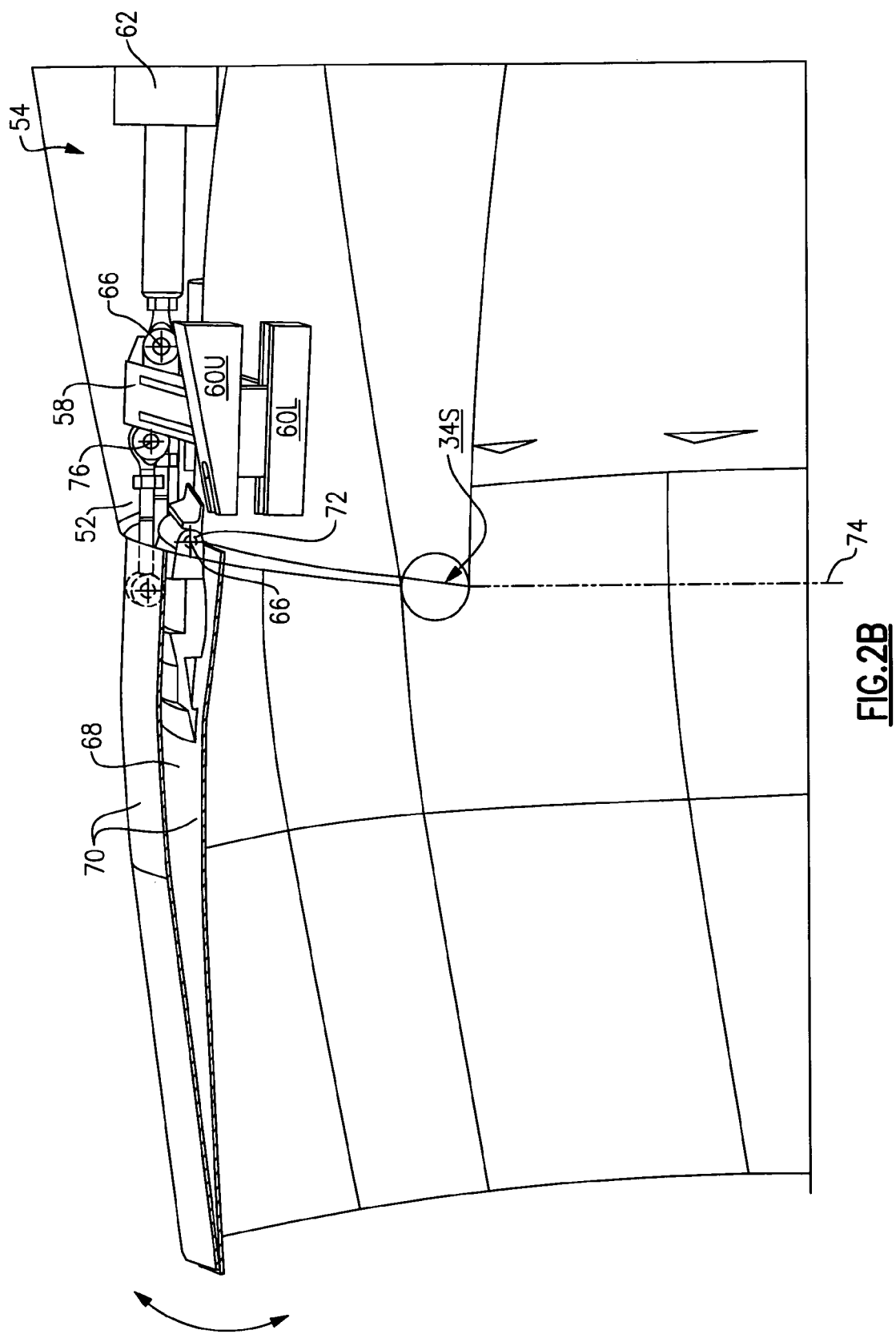
FIG. 2B is a sectional view of the FVAN with a linear actuator.

Referring to FIG. 2B, each flap 50 is pivotally mounted to the fan nacelle 34 at a hinge 56 and linked to the drive ring 58 through the respective flap linkage 52. Each flap 50 of the flap assembly 48 generally includes a flap core 68, an upper flap skin 70U, and a lower flap skin 70L. The core 68 is attached to the flap linkage 52 and defines the hinge 56 which pivotally mounts to a fan nacelle segment 34S at a hinge point 72. The multiple of hinge points 72 of the flap assembly 48 define a circumferential hinge line 74 of the FVAN 42. Each hinge 56 may include bearings, bushings or flexures as generally understood. Each flap 50 also includes a nested tongue and groove arrangement such that the flaps are nested when assembled (FIG. 2A). That is, the skins 70 of each flap 50 preferably engage and overlap an adjacent flap 50 to provide an overlapping flap-seal circumferential interface seal.

The actuators 64 slide axially the drive ring 58 relative a multitude of slider tracks 60 mounted to the fan nacelle 34 to adjust the flap assembly 48 and vary the area defined by the FVAN 28 through which the fan air F is discharged.

The drive ring 58 slides relative the multitude of slider tracks 60 generally along the longitudinal engine axis A. The slider tracks 60 preferably include a lower slider track 60L an upper slider track 60U. The upper slider track 60U may be wedge shaped as the upper slider track 60U is mounted at a fan nacelle segment 34S which is tapered at the interface between the fan nacelle 34 and the flap assembly 48. It should be understood that the slider tracks 60U, 60L are preferably shaped to fit within the fan nacelle segment 34S.

The flap linkage 52 extends from the core 68 and mounts to the drive ring 58 at a flap-ring pivot 76. The flap-ring pivot 76 is radially offset from the flap hinge points 72 on each flap 50 which define the circumferential flap hinge line 74 for the flap assembly 48. Preferably, the flap-ring pivot 76 is radially outboard of each flap hinge point 72 relative the engine axis of rotation A.

In operation, the actuator 62 slides the drive ring 58 relative the multitude of slider tracks 60 generally along the longitudinal engine axis A. The sliding movement of the drive ring 58 drives each flap 50 through the flap linkage 52 to result in pivotal movement of the flap assembly 48 about the circumferential hinge line 74. Pivotal movement of the flap assembly 48 about the flap hinge line 74 varies the diameter of the annular fan nozzle exit area 44 between the fan nacelle 34 and the core nacelle 12.

By adjusting the FVAN 42, engine thrust and fuel economy are maximized during each flight regime. Preferably, the actuator assembly 48 communicates with an engine controller or the like to adjust the position of the FVAN 42. However, other control systems including flight control systems may likewise be usable with the present invention.

The drive ring 58 may be divided into a multiple of sectors such that an associated set of flaps are undependably movable to provide asymmetric operation. That is, the drive ring 58 may be divided into sectors (FIG. 1C) such that each sector is independently movable to vector a thrust from the FVAN 42.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A nacelle assembly for a gas turbine engine comprising:
   a core nacelle defined about an axis;
   a fan nacelle mounted at least partially around said core nacelle, said fan nacelle having a fan variable area nozzle defined about said core nacelle;
   a drive ring mounted within said fan nacelle;
   a flap linkage mounted to each of a multiple of flaps and said drive ring; and,
   an actuator system which drives said drive ring along said axis to vary a fan nozzle exit area defined by said fan variable area nozzle.

2. The assembly as recited in claim 1, wherein said fan variable area nozzle is defined by a multiple of flaps.

3. The assembly as recited in claim 2, wherein said multiple of flaps define a trailing edge of said fan variable area nozzle.

4. The assembly as recited in claim 1, wherein said actuator system includes a multiple of linear actuators.

5. The assembly as recited in claim 1, further comprising a circumferential hinge line defined between said fan variable area nozzle and said fan nacelle, said flap linkage including a flap-ring pivot radially offset from said circumferential hinge line.

6. The assembly as recited in claim 5, wherein said circumferential hinge line is defined radially inboard relative said flap-ring pivot.

7. The assembly as recited in claim 1, wherein said fan nozzle exit area defines an at least partially annular fan nozzle exit area between said fan nacelle and said core nacelle.

8. The assembly as recited in claim 1, wherein said drive ring is divided into a multiple of drive ring segments, each segment including a separately movable flap set of said multiple of flaps.

9. A gas turbine engine comprising:
   a core engine defined about an axis;
   a gear system driven by said core engine;
   a fan driven by said gear system about said axis;
   a core nacelle defined at least partially about said core engine; and
   a fan nacelle mounted around said fan and at least partially around said core nacelle, said fan nacelle having a fan variable area nozzle with a multiple of flaps which defines a fan nozzle exit area downstream of said fan between said fan nacelle and said core nacelle;
   a drive ring mounted within said fan nacelle;
   a flap linkage mounted to each of said multiple of flaps and said drive ring; and,
   an actuator system which drives said drive ring along said axis to vary a fan nozzle exit area defined by said fan variable area nozzle.

10. The engine as recited in claim 9, wherein said drive ring is divided in a multiple of segments, each segment including a separately movable flap set of said multiple of flaps and an actuator of said actuator system.

11. A method of varying a fan nozzle exit area of a gas turbine engine comprising the steps of:
    (A) locating a fan variable area nozzle which defines a fan nozzle exit area between a fan nacelle and a core nacelle;
    (B) axially moving a drive ring disposed within said fan nacelle; and
    (C) pitching a flap assembly of the fan variable area nozzle between a first position and a second position to vary at least a sector of the fan nozzle exit area in response to said step (B).

12. A method as recited in claim 11, wherein said step (C) further comprises:
    (a) increasing the fan nozzle exit area during takeoff.

13. A method as recited in claim 12, wherein said step (B) further comprises:
    (a) sliding the drive ring within the fan nacelle.

14. A method as recited in claim 13, wherein said step (C) further comprises:
    (a) pivoting the flap assembly about a circumferential hinge line defined between the fan variable area nozzle and the fan nacelle, a flap linkage of the flap assembly including a flap-ring pivot radially offset from the circumferential hinge line.

15. A method as recited in claim 14, wherein said step (A) further comprises:
    (a) locating the fan variable area nozzle an aft most section of the fan nacelle, the multiple of flaps including a trailing edge of the fan variable area nozzle.

16. A method as recited in claim 14, wherein said step (B) further comprises:
    (a) axially moving a first segment of the drive ring within a fan nacelle relative a second segment; and
    (b) asymmetrically adjusting the fan nozzle exit area to vector thrust through the fan variable area nozzle.

* * * * *